US009230101B2

(12) United States Patent
Zahran (10) Patent No.: US 9,230,101 B2
(45) Date of Patent: Jan. 5, 2016

(54) PROVIDING ALERTS BASED ON UNSTRUCTURED INFORMATION METHODS AND APPARATUS

(71) Applicant: Pinkerton Consulting and Investigations, Inc., Parsippany, NJ (US)

(72) Inventor: Jack I. Zahran, Millington, NJ (US)

(73) Assignee: Pinkerton Consulting and Investigations, Inc., Parsippany, NJ (US)

( * ) Notice: Subject to any disclaimer, the term of this patent is extended or adjusted under 35 U.S.C. 154(b) by 165 days.

(21) Appl. No.: 13/837,959

(22) Filed: Mar. 15, 2013

(65) Prior Publication Data

US 2014/0283055 A1    Sep. 18, 2014

(51) Int. Cl.
*G06F 21/55* (2013.01)
*G06F 17/30* (2006.01)

(52) U.S. Cl.
CPC .......... *G06F 21/55* (2013.01); *G06F 17/30707* (2013.01)

(58) Field of Classification Search
CPC ............................... G06F 21/55; G06F 21/554
USPC ......................................................... 726/242
See application file for complete search history.

(56) References Cited

U.S. PATENT DOCUMENTS

| 6,014,746 | A * | 1/2000 | Krehnke ............... | G06F 21/554 726/22 |
| 7,337,146 | B2 | 2/2008 | Heelan et al. | |
| 8,037,151 | B1 * | 10/2011 | Daly ................... | H04L 12/1895 709/207 |
| 2005/0055578 | A1 * | 3/2005 | Wright .................. | G06F 21/32 726/4 |
| 2006/0037076 | A1 * | 2/2006 | Roy ..................... | G06F 17/277 726/22 |
| 2009/0106628 | A1 * | 4/2009 | Aciicmez .............. | G06F 21/554 714/763 |
| 2009/0247113 | A1 * | 10/2009 | Sennett et al. ............. | 455/404.1 |
| 2010/0324985 | A1 | 12/2010 | Kumar et al. | |
| 2011/0282949 | A1 * | 11/2011 | Rivkin ................... | G06F 9/541 709/206 |
| 2012/0208492 | A1 * | 8/2012 | Tschofenig ......... | H04M 3/5516 455/404.2 |
| 2012/0221486 | A1 | 8/2012 | Leidner et al. | |
| 2012/0284039 | A1 | 11/2012 | Kass-Hout et al. | |
| 2013/0238356 | A1 * | 9/2013 | Torii et al. ......................... | 705/2 |

OTHER PUBLICATIONS

International Search Report issued Aug. 21, 2014, for corresponding Intl. Appln. No. PCT/US2014/025797 (9 pages).

* cited by examiner

*Primary Examiner* — Hadi Armouche
*Assistant Examiner* — Sher A Khan
(74) *Attorney, Agent, or Firm* — K&L Gates LLP (57) ABSTRACT

A system, method, and apparatus for providing alerts based on unstructured information are disclosed. An example method includes receiving a data item from a remotely located information source, the data item including unstructured information. The method also includes determining a threat score for the data item by matching information associated with the data item to pre-identified information associated with a numerical value. The method further includes responsive to the threat score exceeding a predetermined threshold, creating a Common Alerting Protocol data structure that includes at least a portion of the information associated with the data item and transmitting the Common Alerting Protocol data structure.

20 Claims, 8 Drawing Sheets

News / Africa

Pirates Demand $1.3 Million for Foreign Hostages

Print    Comment (1)    Share:

[Map of West Africa showing countries including SENEGAL, THE GAMBIA, GUINEA BISSAU, GUINEA, SIERRA LEONE, LIBERIA, COTE D'IVOIRE, GHANA, MALI, BURKINA FASO, TOGO, BENIN, NIGER, NIGERIA (with Abuja and Lagos marked), CHAD, CAMEROON, CAR, EQUATORIAL GUINEA, GABON, CONGO, DRC, and the Atlantic Ocean]

VOA News                                    TEXT SIZE
February 20, 2013

Nigerian authorities say a search is underway for pirates demanding a $1.3 million ransom for six foreigners kidnapped from an oil vessel Sunday.

A police spokesman in Bayelsa state said Wednesday that one of the suspected kidnappers called authorities to demand the payment to release the crew members. He said three of the abducted crew members are from Ukraine, two from India and one from Russia.

DATA ITEM 600 SCORE SHEET

SEMANTIC

| | |
|---|---|
| demanding a $1.3 million ransom: | 4.5 |
| kidnapped from an oil vessel Sunday: | 2.1 |
| pirates attacked their ship off the coast of Nigeria: | 2.1 |
| IMB has recorded 10 piracy attacks along Africa's west coast so far this year: | 3.3 |

DICTIONARY

| | |
|---|---|
| pirates (4): | 2.5 |
| International Maritime Bureau (IMB): | 3.2 |
| gunmen (2): | 4.2 |
| armed thefts: | 6.1 |
| hostage: | 5.5 |

LOCATION

| | |
|---|---|
| Nigerian: | 3.4 |
| Africa's West Coast: | 4.2 |
| Nigeria: | 5.3 |

PROVIDING ALERTS BASED ON UNSTRUCTURED INFORMATION METHODS AND APPARATUS

BACKGROUND

Known moderation systems are oftentimes configured to filter and flag content from one source of information. This enables moderation systems to be uniquely configured based on the source of the information. Other known moderation systems are configured to filter and flag information from multiple information sources. However, these known moderation systems are configured to process only structured information generated from the sources.

For example, some information sources (e.g., the Department of Homeland Security and the National Oceanic and Atmospheric Administration) generate information according to a Common Alerting Protocol ("CAP") format. This protocol defines a template for classifying information included within alerts that includes clearly labeled data fields that specify an urgency of an alert, a severity of an alert, a category of an alert, and a certainty of an alert. The protocol also defines how geographic locations associated with the alert are to be specified (e.g., by latitude and longitude). Similarly, other information sources may structure information according to a Specific Area Message Encoding ("SAME") format or a Commercial Mobile Alert System ("CMAS").

Current moderation systems use the predefined formats/templates of the information sources to effectively identify relevant information. For example, known moderation systems include algorithms that search for information labeled in CAP data fields (e.g., urgency, severity, certainty, and category) to determine how to score and route the information. These known algorithms are effective because the information is received in a known format.

However, these known moderation algorithms are ineffective processing unstructured information because there is no defined data format that identifies the importance of the information. As a result, known moderation systems disregard unstructured information. There accordingly exists a need to provide moderation of unstructured information.

SUMMARY

The present disclosure provides a new and innovative system, method, and apparatus for providing alerts based on unstructured information. In an example embodiment, a method includes receiving a data item from a remotely located information source, the data item including unstructured information. The method also includes determining a threat score for the data item by matching information associated with the data item to pre-identified information associated with a numerical value. The method further includes responsive to the threat score exceeding a predetermined threshold, creating a CAP data structure that includes at least a portion of the information associated with the data item and transmitting the Common Alerting Protocol data structure.

In another embodiment, a moderation system includes an interface configured to receive an unstructured data item from a data source and a semantic classifier configured to determine a first threat score by determining content within the data item that substantially matches pre-identified semantic information. The moderation system also includes a dictionary classifier configured to determine a second threat score by determining the content within the data item that substantially matches pre-identified dictionary information and a location identifier configured to determine a third threat score by determining the content within the data item that substantially matches geographic location information. The moderation system further includes a content scorer configured to determine whether the combination of the first, second, and third threat scores is greater than a predetermined threshold and a processor configured to create a Common Alerting Protocol data structure based on at least some of the content within the data item and the combined threat score responsive to the content scorer determining that the combined threat score is greater than the predetermined threshold.

While the example embodiments disclosed herein include generating CAP data structures from unstructured data items, it should be appreciated that other types of protocol-based data structures rather than CAP could be generated. Further, while the example embodiments disclosed herein use CAP data structures to provide alerts to clients, it should be appreciated that the example system may provide communication pattern identification for any type of unstructured information that may be reviewed by one or more moderators. The disclosed system may be configured to provide certain structured data outputs based on the context in which the system is implemented.

Additional features and advantages of the disclosed system, method, and apparatus are described in, and will be apparent from, the following Detailed Description and the Figures.

DETAILED DESCRIPTION

The present disclosure relates in general to a method, system, and apparatus to provide structured information, and in particular, to provide structured information based at least in part on unstructured information. The conversion from unstructured to structured information (and corresponding classification) enables data structures to be generated that are compatible with multiple structure-dependent systems. While the outputs are disclosed herein as CAP data structures (e.g., CAP alerts), it should be appreciated that in other embodiments the output can include Rich Site Summaries ("RSS"), flat files, databases, and/or XML.

Figure 6:
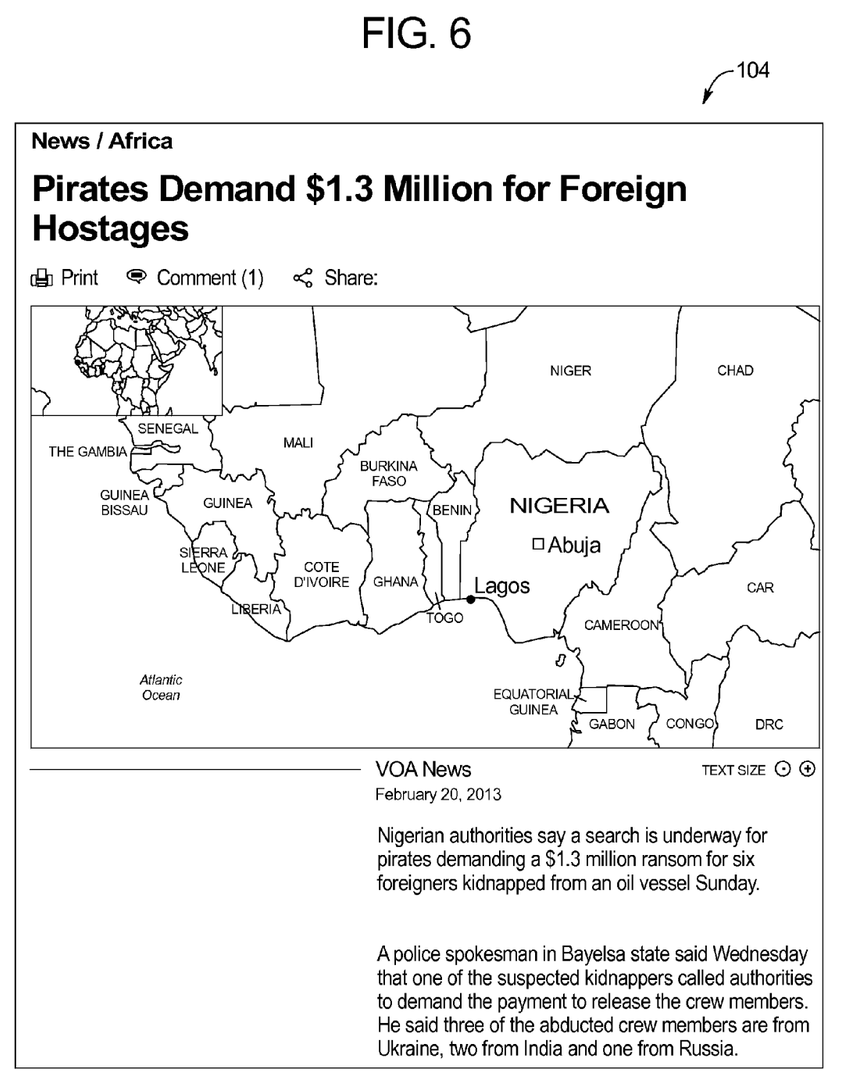
FIG. 6 shows an example of an unstructured data item transmitted to the moderation system of FIGS. 1 to 3.

As disclosed herein, unstructured information is information (e.g., text, pictures, graphs, charts, video, audio, images, maps, etc.) that is generally assembled in a document or data structure without identifying or labeling particular portions of the information. Unstructured information includes, for example general webpage information, audio/visual information, metadata, and social media content. An example of unstructured information (i.e., an online news article) is shown in FIG. 6.

For comparison, structured information is configured based on a template or a known format. Structured information often includes labels or data fields that identify how certain words or phrases within the information are to be interpreted. The labels are specifically named so that the structured information can be easily identified by an automated interpretation system. For example, an alert configured for a CAP format identifies the category of the alert and a geographic location affected by the alert. In contrast, an unstructured news article generally includes text and graphics. There is no indication as to the relevance of any of the text of graphics. Furthermore, individual terms or phrases within the article are not individually labeled or identified as pertaining to certain types of information.

In an example of unstructured information, an online media company publishes online articles to a webpage. While the text and pictures (e.g., information) within the article are formatted for viewing, the text and pictures are not assigned a label based on any protocol. In other words, the text and pictures are unstructured information. For instance, a severity or urgency of the information within the article is not labeled. At most, some online media companies may provide hyperlinks for certain words or phrases within the article to other articles or graphics. Additionally, some articles may include key words associated with the article or metadata embedded within the article. However, these key words and metadata are for search engines and are not structured information.

Unstructured information is generated by information sources including, for example, information channels and data feeds (e.g., RSS). Information channels are websites that provide information for display in a web browser. For example, media channels can include CNN, BBC, and MSNBC, security channels can include CHP, the Department of Homeland Security, and the Central Intelligence Agency, and weather channels can include the World Meteorological Organization, the Weather Channel, and the National Hurricane Center. Information channels can also include social media websites operated by, for example, Facebook, Twitter, Foursquare, Google, etc. Data feeds are streams of information provided by information sources. In some instances, an information source can function as an information channel and as a data feed.

In an example embodiment, a moderation system receives (or requests) unstructured information from many different information sources. The moderation system may also receive structured information. For each piece of unstructured information (e.g., a data item) the example moderation system performs an analysis to determine a threat score. The analysis includes a semantic comparison of words or phrases within the data item to pre-identified semantic words or phrases, which are each assigned a weighted score. The analysis also includes a dictionary comparison of words or phrases within the data item to pre-identified dictionary words or phrases, which are also each assigned a weighted score. The analysis may further include a determination of one or more geographic (or logical) locations associated with the data item.

The difference between the semantic comparison and the dictionary comparison is based on the context usage of the terms or phrases. For instance, a dictionary comparison searches for particular words (e.g., Nuclear, Hostage, War, Hurricane, etc.) regardless of the context. As long as there is a match in a dictionary comparison, a weighted threat score is assigned to the matching terms in the data item.

In contrast, a semantic comparison analyzes the usage of terms and phrases based on the context of and patterns within the unstructured information. Semantic comparisons can determine, for example, a tone or theme of unstructured information and assign a corresponding score. Semantic comparisons can also be applied to non-English based unstructured information for assigning threat scores. For example, a terrorist organization may use a hybrid version of multiple languages (e.g., a complex mélange of colloquialisms, cover terms, and natural language) to communicate information. After adequate calibration using representative examples of the unstructured information, semantic comparisons may be performed on this unstructured information despite the fact that the precise definitions of individual terms is unknown. As disclosed herein, the pre-identified information used for semantic comparisons is periodically updated to reflect new usage and patterns in human communication.

Returning to the example embodiment, after a threat score is determined for a data item, a moderation system determines whether the data item should be promoted to an alert. To make this determination, the moderation system compares the threat score to one or more thresholds. Responsive to the threat score exceeding a certain threshold, the moderation system formats at least some of the information within the data item to a CAP formatted data structure. In other words, the moderation system uses information that generated the greatest threat scores within the data item as the information that is included within the CAP data structure. Additionally, the moderation system creates labels with the CAP data structure including, for example, 'urgency,' 'severity,' 'category,' 'certainty,' and other specified labels based on the information within the data item and/or the threat score. The example moderation system transmits the CAP data structure to a decision system, which determines whether to alert one or more clients.

However, if the threat score does not exceed a threshold, the moderation system routes the data item to a moderator. The moderator then determines whether the data item should be promoted as an alert or discarded. Alternatively, the moderation system, instead of the moderator, may discard the data item if the threat score is below a certain threshold.

While the disclosed moderation system is described in conjunction with identifying information that poses a threat to a client, it should be appreciated that the moderation system can be used by any system that moderates or processes unstructured information. In other words, data structures generated by the moderation system may be created for virtually any format for direct throughput to databases, flat files (e.g., Excel files), RSS feeds, or other format schema (e.g., XML). For example, social media companies may use the example moderation system to quickly identify and remove objectionable content. In another example, publishers of media content oftentimes include a comments section at the bottom of an online article. The example moderation system disclosed herein can be used by these media publishers to identify objectionable comments to avoid offending viewers of the article.

Moderation Environment

Figure 1:
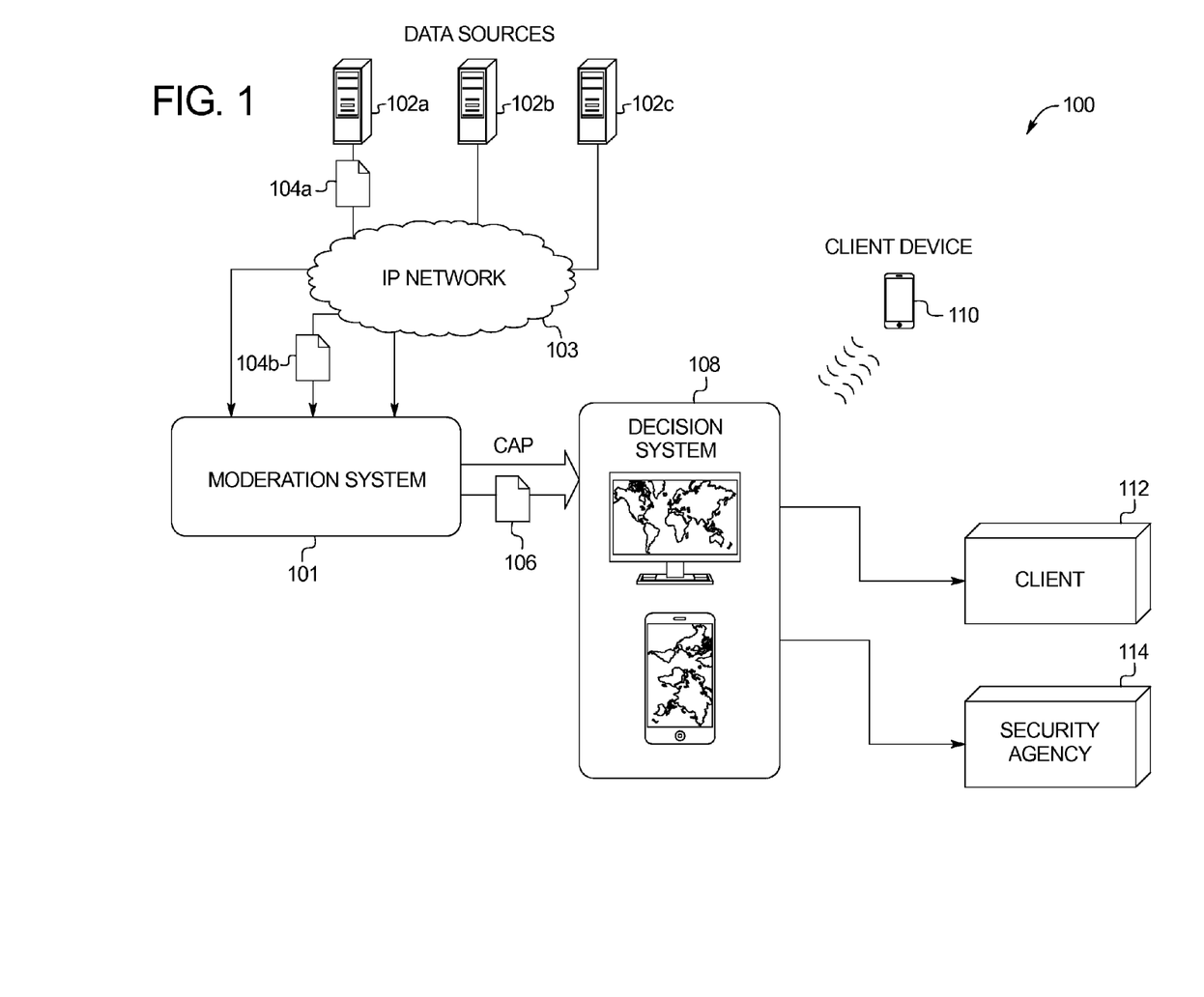
FIG. 1 shows a block diagram of an example moderation environment for providing alerts based on unstructured information, according to an example embodiment of the present invention.

The disclosed system may be readily realized in a moderation environment. A high level block diagram of an example moderation environment 100 is illustrated in FIG. 1. The illustrated system 100 includes a moderation system 101 that receives information from data sources 102 via a network 103 (e.g., the Internet). The information includes structured and unstructured information. The data sources 102 can include any host, server, processor, computer, cloud computing network that generates information. Each portion of received information is referred to herein as a data item 104.

A data item 104 includes, for example, a compartmentalized piece of information that has a unique web address (e.g., a webpage), was generated during a session (e.g., a social media message), and/or was generated as a single instance of information. The data item 104 can also include a periodic stream of data from, for example, an RSS data feed. The data item 104 can further include any video, audio, image, map, graphical representation, and/or meme that is accessible via the Internet.

The example moderation system 101 may subscribe to one or more data sources 102 to automatically receive data items 104. Alternatively, the moderation system 101 may query the data sources 102 for data items 104. The query may be performed hourly, daily, weekly, monthly, etc.

Figure 2:
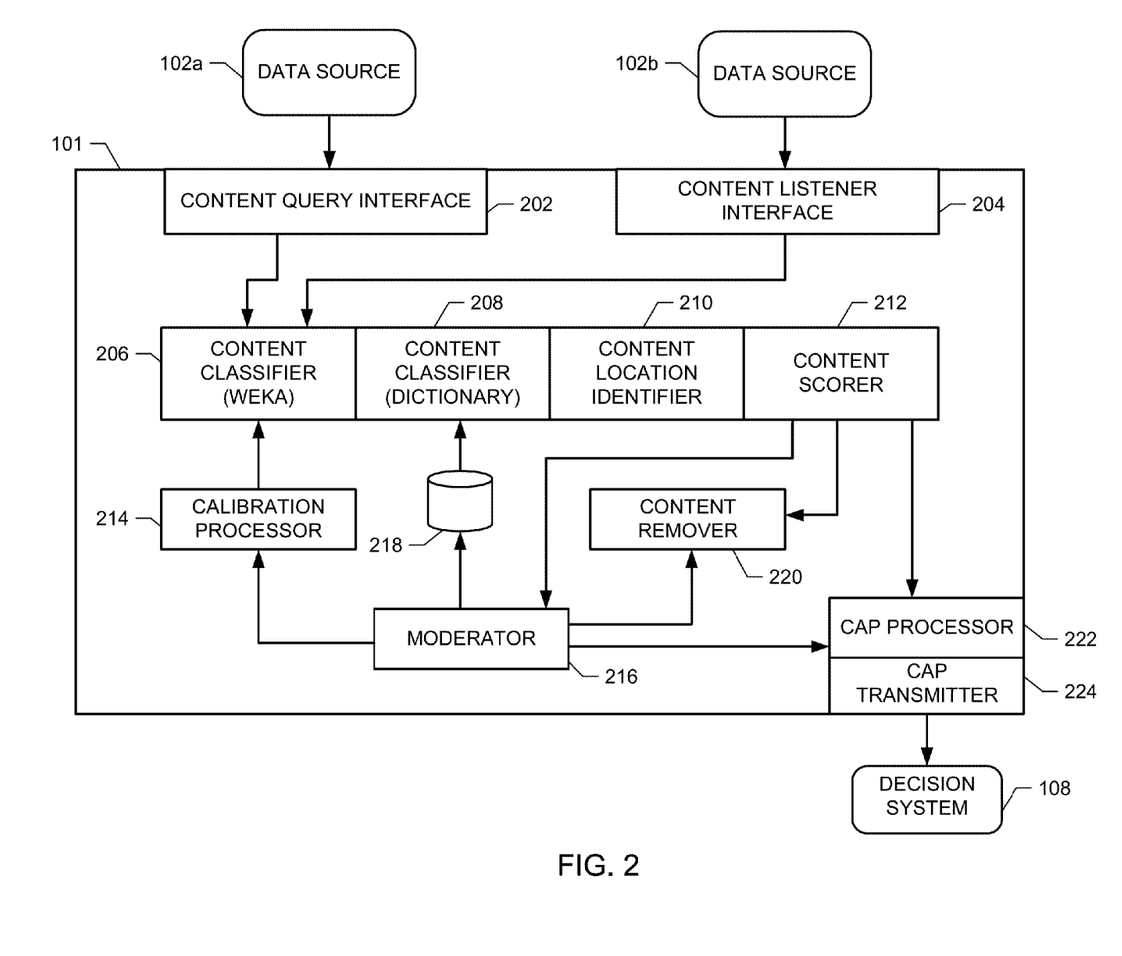
FIG. 2 shows an example functional diagram of a moderation system, according to an example embodiment of the present invention.

As described in conjunction with FIG. 2, the example moderation system 101 classifies unstructured data from the data sources 102 to determine a threat score. Based on the threat score, the moderation system 101 either generates a CAP alert 106 that includes information included within a scored data item 104, discards the data item 104, or routes the data item 104 to a moderator. The moderator then decides whether the data item should be promoted to an alert or discarded.

Any CAP alerts 106 generated by the moderation system 101 are transmitted to a decision system 108. The example decision system 108 aggregates CAP alerts 106 to determine whether there is a security or safety risk for one or more subscribing clients. The decision system 108 may operate as a combination of machine intelligence with human operators to determine when a situation warrants action. If the decision system 108 determines that a client is at risk, the decision system 108 transmits one or more alerts to, for example, a client device 110 (e.g., any smartphone, tablet computer, laptop, personal computer, server used by a client), a client 112 (e.g., individuals or an organization), or a security agency 114 hired to protect the client 112. The security agency 114 can also include a public security force.

While the moderation system 101 is shown as a single entity, it should be appreciated that the system may be comprised of one or more servers, processors, etc. Further, the moderation system 101 may be distributed within a cloud computing network. Alternatively, the moderation system 101 may operate in conjunction with an application server or other host that includes content that could be moderated.

Moderation System

FIG. 2 shows an example functional diagram of the moderation system 101 of FIG. 1. It should be appreciated that the diagram shown in FIG. 1 is only one example of implementing the moderation system 101. In other embodiments, the functional blocks may be combined, removed, rearranged or expanded. For instance, the moderation system 101 may additionally include components to format information from data items for other types of protocols rather than CAP.

To compile information from data sources 102, the example moderation system 101 includes a content query interface 202 and a content listener interface 204. The example content query interface 202 is configured to search websites (and other Internet accessible content) for information (structured and unstructured) generated by the data sources 102a. The content query interface 202 may also subscribe to data sources 102a from which data items are periodically pulled. For example, the content query interface 202 may be configured to access and pull data items from different data sources at different time intervals such that more relevant websites and data feeds are accessed more frequently. It should be appreciated that this configuration is useful for gathering information from data sources 102a that frequently publish information.

The example content listener interface 204 is configured to receive content (e.g., data items) pushed from data sources 102b. For example, the content listener interface 204 may register to receive data items from one or more Twitter users, hashtags, and/or keywords. Thus, the content listener interface 204 receives data items as the information is generated. This configuration is particular useful for receiving data items from numerous accounts that may only periodically publish information.

The example content query interface 202 and the example content listener interface 204 are configured by personnel of the moderation system 101 to access specifically identified data sources 102. For example, personnel may specify that the content query interface 202 is to access a specific list of websites and data feeds for data items. In the same manner, personnel specify which social media accounts are to be subscribed to by the content listener interface 204. Additionally or alternatively, the content query interface 202 and/or the content listener interface 204 may include one or more algorithms that select which data sources 102 are accessed based on determinations as to which data sources previously provided relevant data items. For instance, after a period of time, the moderation system 101 compiles a data structure of the top 100 data sources 102 that generated data items used in alerts. The interfaces 202 and 204 are accordingly configured to access at least (or at most) these top 100 data sources.

To process unstructured data items 104 compiled by the interfaces 202 and 204, the example moderation system 101 includes analysis components (e.g., a semantic classifier 206, a dictionary classifier 208, a location identifier 210, and a content scorer 212). These components are configured to analyze the data items for content that matches pre-identified content to determine a threat score. In some embodiments, each component may assign a score. Alternatively, each data item is assigned one threat score based on the analysis of the components 206 to 212.

It should be noted that structured data is not processed through the components because the relevant information is already labeled and identified. Instead, the moderation system 101 routes structured data items directly for generation into a CAP (or other specified type) data structure. Alternatively, the moderation system 101 may include a separate module for receiving and processing structured data items.

In the illustrated example of FIG. 2, the pre-identified content is selected based on known terms, phrases, and semantics that correspond to conditions or events that could be a concern to subscribing clients. The pre-identified content may also be selected or acquired from external resources (e.g., online dictionaries). In some examples, the pre-identified content may be specific for a particular client. Alternatively, the pre-identified content is common (or at least considered) for all clients.

It should be appreciated that these components are configured to process many thousands of data items within relatively short periods of time. For example, the interfaces 202 and 204 typically compile thousands of data items a minute. The components 206 to 212 accordingly have to process these thousands of data items within the same time period. Otherwise, the moderation system 101 would generate a backlog of data items, thereby reducing the effectiveness of the system.

In particular, the semantic classifier 206 is configured to analyze data items based on context, language, and patterns of terms and phrases to assign a threat score. The semantic classifier 206 uses one or more machine learning algorithms to identify relevant content within the data items. For example, the semantic classifier 206 may include a Waikato Environment for Knowledge Analysis ("Weka") algorithm to match pre-identified content to content within data items.

The example semantic classifier 206 is calibrated by a calibration processor 214, which uses days, weeks, or years of training data (e.g., previously received data items and/or specifically designed data items) to determine how information is to be classified. For example, the calibration processor 214 compiles two or three weeks of data items associated with a particular issue (e.g., weather, terror, political instability, etc.). The calibration processor 214 then analyzes these data items using natural language algorithms to identify trends, patterns, and semantics. Moderators may also tune the calibration processor 214 based on initial results to provide more accurate classifications of information. For example, moderators may instruct the calibration processor 214 to consider one or more phrases that were not initially flagged or flagged with a relatively low threat score. Additionally, moderators may review the data items with the 100 greatest threat scores and determine if the threat score is warranted. The calibration processor 214 receives feedback of any changes to threat scores and adjusts weighting of pre-identified content, removes pre-identified content, and/or adds pre-identified content as appropriate.

In addition to defining pre-identified content, the example calibration processor 214 determines a threat score for each piece of content. The threat scores are weighted numerical values that correspond to how likely that particular term, phrase, or data item in general is a threat to one or more clients. The semantic weighting of pre-identified information means that, for example, a phrase that includes the word 'nuclear' is weighted relatively higher when the context is North Korea or a terrorist organization compared to when the context is power generation. Further, threat scores may be generated for each label of a CAP data structure, including generating a separate score for urgency, severity, category, and certainty.

For example, the calibration processor 214 may perform a calibration routine for pirate activity on the Horn of Africa. The calibration processor 214 analyzes data items to determine common usage of terms, tone, and patterns for identifying which data items include relevant new information of concern (e.g., a government alert reporting a recent hijacking of a cargo vessel), which data items include reports of past events (e.g., an online news article recapping a hijacking attempt), and which data items are irrelevant (e.g., a sports article about the Pittsburgh Pirates). In this instance, the calibration processor 214 may search for dates in comparison of a date the data item was generated, the tense (present or past) of terms, and patterns regarding how breaking news is worded compared to how general reports are worded.

The calibration processor 214 also identifies terms which indicate that the data item is not relevant. This can include, for example, determining that an article is related to baseball by locating semantic pre-identified baseball information within the data item. This matching pre-identified baseball information may be associated with a negative or relative low threat score when the context of the analysis is illegal pirate activity in Africa. The low threat score applied to the article by the semantic classifier 206 causes the data item to be discarded.

In another example, the calibration processor 214 may operate a calibration routine for a new pseudo-language communications being employed by a terrorist group. The calibration processor 214 analyses messages, for example, over social media to identify patterns and determine meanings of phrases (e.g., determine pre-identified information). The semantic classifier 206 uses this information to then assess whether a data item corresponds to the terrorist group. As a result, an increase in alerts (corresponding to a detected increase in data items generated by the terrorist group) may signal that a terrorist event is about to occur. Thus, while the exact translation of the data items is not available, the calibration processor 214, in conjunction with the semantic classifier 206, uses compiled pre-identified information to assign an appropriate threat score.

In some embodiments, the semantic classifier 206 may include additional analytic algorithms including, for example, algorithms provided by Entegra, Analysts Notebook, Palantir, FalconView, etc. to provide further analysis of information within the data item. For instance, these algorithms may perform link/network analysis and/or text extraction to identify, for example, meanings within pseudo-language communications to determine threat score(s). Alternatively, CAP data structures may be analyzed by these algorithms.

After being calibrated, the example semantic classifier 206 analyzes data items by comparing the data items to pre-identified semantic information. The content scorer 212 then determines a threat score of the semantic classification based on the matching pre-identified information. In some instances, the content scorer 212 references threat scores for the matching pre-identified information and adds each of the threat scores to determine a total semantic threat score for the data item. Alternatively, the content scorer 212 analyzes the matching pre-identified information and determines a total semantic threat score for the data item based on one or more algorithms configured to quantify information The example content scorer 212 also routes the data item after determining a threat score for the data item. In some embodiments, the content scorer 212 routes the data item after determining only the semantic threat score. For example, responsive to determining that the semantic threat score exceeds a threshold, the content scorer 212 routes the data item to be structured into a CAP alert. In this instance, the data item is created into an alert without the dictionary classifier 208 analyzing the data item. Further, if the semantic threat score is below a threshold, the content scorer 212 routes to the data item to the dictionary classifier 208 and/or the location identifier 210. Alternatively, the content scorer 212 may route the data item to a moderator 216.

The example dictionary classifier 208 of FIG. 2 is configured to compare terms (or phrases) with data items to a data structure 218 that includes pre-identified terms (or phrases). The pre-identified terms are selected by personnel (e.g., personnel working in conjunction with the moderator 216) based on previous data items and/or trending current events. The pre-identified terms may also include names, slang, initials, or other groupings of characters.

For instance, the moderator 216 updates the data structure 218 with the name of a newly elected world leader or a newly formed terrorist organization. The data structure 218 is dynamically updated for each processed data item. Additionally, the data structure 210 may include a thesaurus, which is similarly updated by collective moderation and/or administration. The example data structure 218 of FIG. 2 may be implemented by any computer-readable medium, including RAM, ROM, flash memory, magnetic or optical disks, optical memory, or other storage media.

The example dictionary classifier 208 operates in conjunction with the content scorer 212 to determine either a total threat score or a dictionary threat score. The content scorer 212 determines a dictionary score based on individually weighted scores for matching pre-identified terms, phrases, or expressions. The scores may be weighted based on a number of occurrences of, for example, a matching term within a data item. The scores may also be weighted based on the term or phrase. For example, the term 'ballistic missile' corresponds to a greater weight than the term 'protest.'

In addition to performing semantic and dictionary classification, the example moderation system 101 of FIG. 2 analyzes data items using the location identifier 210. The example location identifier 210 is configured to analyze unstructured data items for terms or expressions that identify geographic locations. The place names of the geographic locations may take the form of any combination of organically evolved, web service, and/or other external lexicon, and may be referenced on a pre-determined and/or prioritized basis. For example, the location identifier 210 searches the text and metadata of a data item for the names of cities, states, countries, regions, etc.

In some embodiments, the location identifier 210 operates in conjunction with the content scorer 212 to determine a location threat score. In these embodiments, certain locations (e.g., Iran, North Korea, Egypt, etc.) may correspond to a greater threat score than other locations. Alternatively, the location identifier 210 operates in conjunction with the classifiers 206 and 208 to determine a location in addition to semantics and dictionary terms.

As discussed above, the content scorer 212 routes a data item based on a threat score. Data items that have a threat score that is below a certain threshold are routed to a content remover 220, which is configured to purge or delete the data item. In some embodiments, the content remover 220 caches data items 220 for a predetermined time period before deleting them. For example, the content remover 220 may cache data items for three days to ensure that a data item was not inadvertently discarded by the content scorer 212. During this time, personnel working in conjunction with the moderator 216 analyze the cached data items to determine if any should have instead been promoted to an alert.

Data items that have threat scores greater than the discard threshold but less than a promotion threshold are routed by the content scorer 212 to the moderator 216. The example moderator 216 includes one or more personnel that manually review data items. The moderator 216 of FIG. 2 may include components to manage how personnel review the data items. For instance, the moderator 216 can include queue management that routes data items to the appropriate personnel (e.g., based on location information, threat category, threat score, etc.) and places data items within a queue based on, for example, the threat score.

Personnel associated with the moderator 216 review and determine whether data items are routed to the content remover 220 or promoted to a CAP alert. The moderator 216 may also transmit messages to the calibration processor 214 and/or the data structure 218 based on which data items were removed or promoted. The messages can include an identifier of the data item and/or the contents of the data item in conjunction with a threat scores (or semantic threat score separated from the dictionary threat score).

To provide CAP alerts to the decision system 108 of FIG. 1, the example moderation system 101 of FIG. 2 includes a CAP processor 222 and a CAP transmitter 224. The example CAP processor 222 is configured to convert a data item (and/or the corresponding threat score) into a CAP data structure used as an alert by the decision system 108. To create a CAP data structure, the example CAP processor 222 formats at least some of the information within the data item into a CAP template.

As discussed above, a CAP template includes an 'urgency' field, a 'severity' field, a 'certainty' field, and a 'category' field. In addition, the CAP template includes a 'geographic location' field, a 'headline' field, an 'information source field', and a 'description' field. The example CAP processor 222 selects information that was identified in the classifiers 206, 208, and 210 to use as information for the fields. The CAP processor 222 may also use the threat score to determine how descriptors for the urgency field, severity field, certainty field, and category field are selected. Alternatively, the CAP processor 222 uses individually determined threat scores for each of the fields to determine the descriptor.

In an example, the severity field can be labeled as one of 'Concern,' 'Caution,' 'Severe,' 'Disastrous,' etc. The CAP processor 222 selects the correct label either based on a threat score corresponding to the severity level (e.g., a severity threat score corresponding to the 'Caution' label) or information within the data item indicative of the severity (e.g., terms such as 'wide spread damage,' 'winds exceeding 100 miles an hour,' etc.). Similarly, the CAP processor 222 selects labels for other fields within the CAP data structure.

The CAP processor 222 selects which information is to be included within a 'description' field based on which portions of the data item have the most terms or phrases that match pre-identified content. Additionally or alternatively, the CAP processor 222 selects introductory portions of the data item for the 'description' field. Further, the CAP processor 222 uses location information identified by the location identifier 210 to include within the 'geographic location' field. In some instances the CAP processor 222 may determine a latitude and longitude for the 'geographic location' field using the identified location information.

Moreover, the CAP processor 222 may append any images, video, audio, etc. to the CAP data structure. The CAP processor 222 may append the multimedia content by including a link (e.g., a hyperlink) to the content within the CAP data structure. Alternatively, the CAP processor 222 may attach (or store) the multimedia content to the CAP data structure.

The CAP processor 222 of FIG. 2 may also be configured to filter redundant CAP data structures from being transmitted to, for example, the decision system 108. For example, the CAP processor 222 may cache for a predetermined period of time (e.g., days, weeks, months, etc.) data items and/or CAP data structures that were sent to the decision system 108. The CAP processor 222 may compare each newly received data item (or newly created CAP data structure) to the cached information to determine if the same instance of information has already been transmitted. Any information that is redundant may be disposed by the CAP processor 222, thereby reducing the amount of redundant information processed by the decision system 108. For example, Associated Press or Reuters articles are republished by different online publishers. The CAP processor 222 accordingly filters redundant data items from different data sources 102 based on the same news story.

The example CAP processor 222 may further be configured to determine which client(s) is associated with a CAP data structure. To determine the client, the CAP processor 222 may match client employee names, client facility locations, client product names, etc. to information within a data item. For example, the CAP processor 222 may identify that all CAP data structures associated with Nogales, Mexico are to be transmitted to client(s) with a manufacturing plant within that city. Alternatively, the decision system 108 associates CAP data structures with particular clients. In these alternative embodiments, the CAP processor 222 may include within the CAP data structure the name(s) of the associated clients.

The example CAP transmitter 224 of the illustrated example is configured to transmit CAP data structures to the decision system 108 of FIG. 1. The CAP data structures are sent as CAP alerts to be further processed by the decision system 108 to determine if an action is to be performed. The example CAP transmitter 224 may be configured to transmit CAP data structures as they are received from the CAP processor 222. Alternatively, the CAP transmitter 224 may periodically transmit CAP data structures (e.g., every five minutes, ten minutes, etc.).

It should be appreciated that while the moderation system 101 of FIG. 2 was described as processing text, the system is also configured to generate CAP data structures by analyzing data items that include unstructured video, images, audio, maps, etc. For example, the location identifier 210 may use image recognition to determine a geographic location from one or more images. In another example, the semantic classifier 206 may be configured to analyze video to identify a riot. Moreover, the dictionary classifier 208 may be configured to convert audio to text (and textual sounds) and compare this converted audio to pre-identified text.

It should be appreciated from the moderation system 101 of FIG. 2 that relatively greater amounts of processing and analysis are needed to determine whether an alert should be generated based on unstructured data. For instance, the moderation system 101 analyzes substantially all content within a data item to determine a threat score. This includes metadata, text, pictures, video, audio, etc. In comparison, structured information already has the appropriate information configured into known template fields and labeled. As a result, relatively less processing is necessary to determine whether an alert should be generated based on structured information.

Processor

Figure 3:
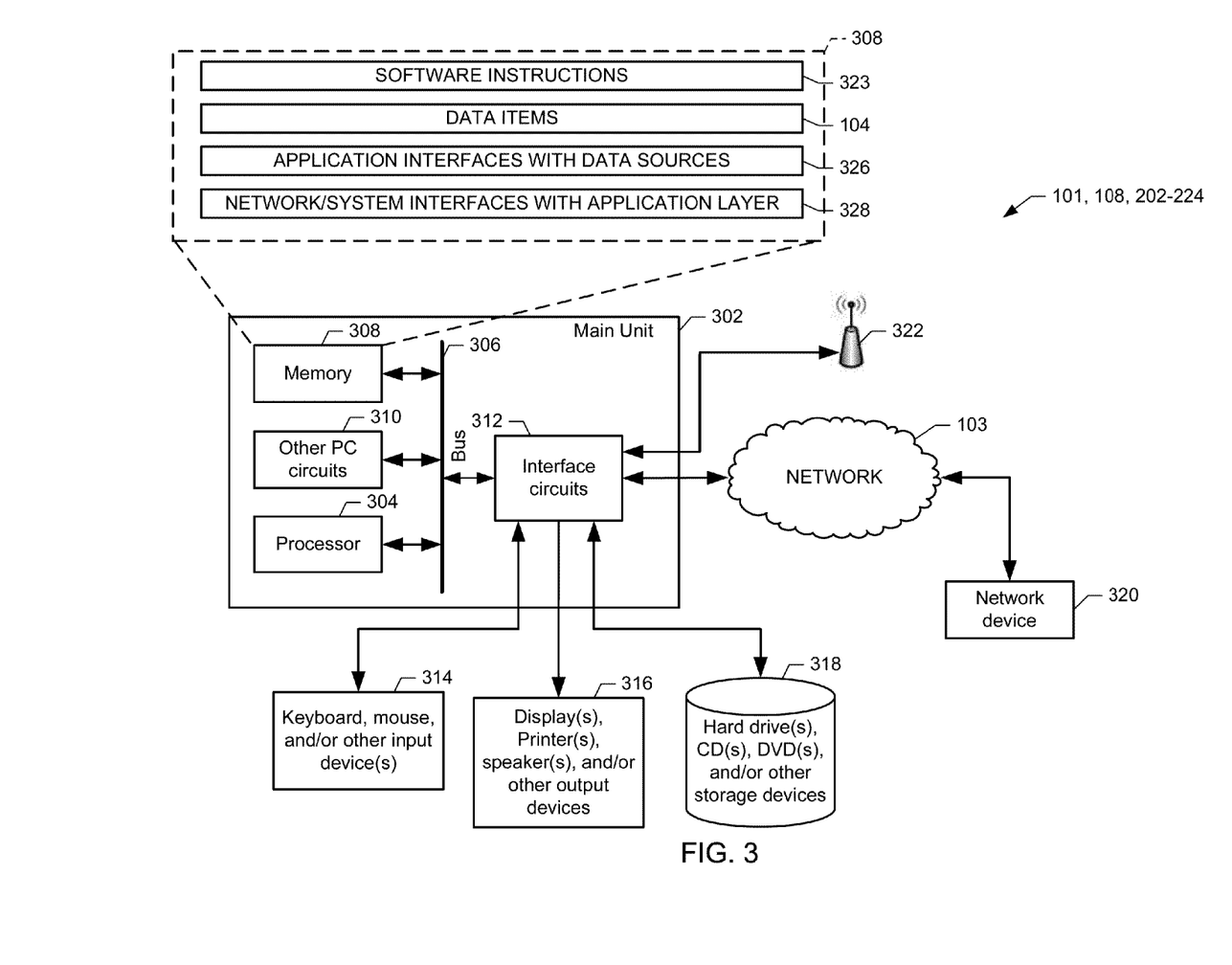
FIG. 3 shows an example functional diagram of one or more components of the moderation system, according to an example embodiment of the present invention.

A detailed block diagram of electrical systems of an example computing device (e.g., a moderation system 101, a decision system 108, and/or components 202-224) is illustrated in FIG. 3. In this example, the moderation system 101, the decision system 108, and/or any one of the components 202-224 includes a main unit 302 which preferably includes one or more processors 304 communicatively coupled by an address/data bus 306 to one or more memory devices 308, other computer circuitry 310, and one or more interface circuits 312. The processor 304 may be any suitable processor, such as a microprocessor from the INTEL PENTIUM® or CORE™ family of microprocessors. The memory 308 preferably includes volatile memory and non-volatile memory. Preferably, the memory 308 stores a software program that interacts with the other devices in the moderation environment 100, as described above. This program may be executed by the processor 304 in any suitable manner. In an example embodiment, memory 308 may be part of a "cloud" such that cloud computing may be utilized by the moderation system 101, the decision system 108, and/or any one of the components 202-224. The memory 308 may also store digital data associated with pre-identified content/information (and corresponding threat scores), data items, CAP data structures, etc. retrieved from the moderation system 101, the decision system 108, any one of the components 202-224 and/or loaded via an input device 314.

The example memory devices 308 store software instructions 323, data items 104, data source interface features, CAP data structures, permissions, protocols, configurations, pre-identified content, calibration instructions, and/or application interface information 326 (e.g., information for accessing and using data items from data sources 102). The memory devices 308 also may store network or system interface features, permissions, protocols, configuration, and/or network interface information 328 (e.g., information associated with the interfaces 202 and 204) for use by the moderation system 101, the decision system 108, and/or any one of the components 202-224. It will be appreciated that many other data structures and records may be stored in the memory device 308 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, track ball, isopoint, image sensor, character recognition, barcode scanner, microphone, and/or a speech or voice recognition system.

One or more displays, printers, speakers, and/or other output devices 316 may also be connected to the main unit 302 via the interface circuit 312. The display may be a cathode ray tube (CRTs), a liquid crystal display (LCD), or any other type of display. The display generates visual displays generated during operation of the moderation system 101, the decision system 108, and/or any one of the components 202-224. For example, the display may provide a user interface and may display CAP data structures provided by the moderation system 101. A user interface may include prompts for human input from personnel associated with the system 101 including links, buttons, tabs, checkboxes, thumbnails, text fields, drop down boxes, etc., and may provide various outputs in response to the user inputs, such as text, still images, videos, audio, and animations.

One or more storage devices 318 may also be connected to the main unit 302 via the interface circuit 312. For example, a hard drive, CD drive, DVD drive, and/or other storage devices may be connected to the main unit 302. The storage devices 318 may store any type of data, such as pre-identified content, threat scores, security data, etc., which may be used by the moderation system 101, the decision system 108, and/or any one of the components 202-224.

The moderation system 101, the decision system 108, and/or any one of the components 202-224 may also exchange data with other network devices 320 via a connection to the Internet or a wireless transceiver 322 connected to the Internet. Network devices 320 may include one or more servers, which may be used to store certain types of data, and particularly large volumes of data which may be stored in one or more data repository. A server may include any kind of data including databases, programs, files, libraries, records, images, documents, requirements, transaction data, operations data, configuration data, index or tagging data, data items, unstructured information, statistical data, security data, etc. A server may store and operate various applications relating to receiving, transmitting, processing, and storing the large volumes of data. It should be appreciated that various configurations of one or more servers may be used to support and maintain the environment 100. For example, servers may be operated by various different entities. Also, certain data may be stored in the moderation system 101, the decision system 108, and/or any one of the components 202-224 which is also stored on a server, either temporarily or permanently, for example in memory 308 or storage device 318. The network connection may be any type of network connection, such as an Ethernet connection, digital subscriber line (DSL), telephone line, coaxial cable, wireless connection, etc.

Access to the moderation system 101, the decision system 108, and/or any one of the components 202-224 can be controlled by appropriate security software or security measures. An individual users' access can be defined by the moderation system 101, the decision system 108, and/or any one of the components 202-224 and limited to certain data and/or actions. Accordingly, users of the moderation environment 100 may be required to register with one or more of the moderation system 101, the decision system 108, and/or any one of the components 202-224.

Flowchart of Example Data Item Analysis

Figure 4:
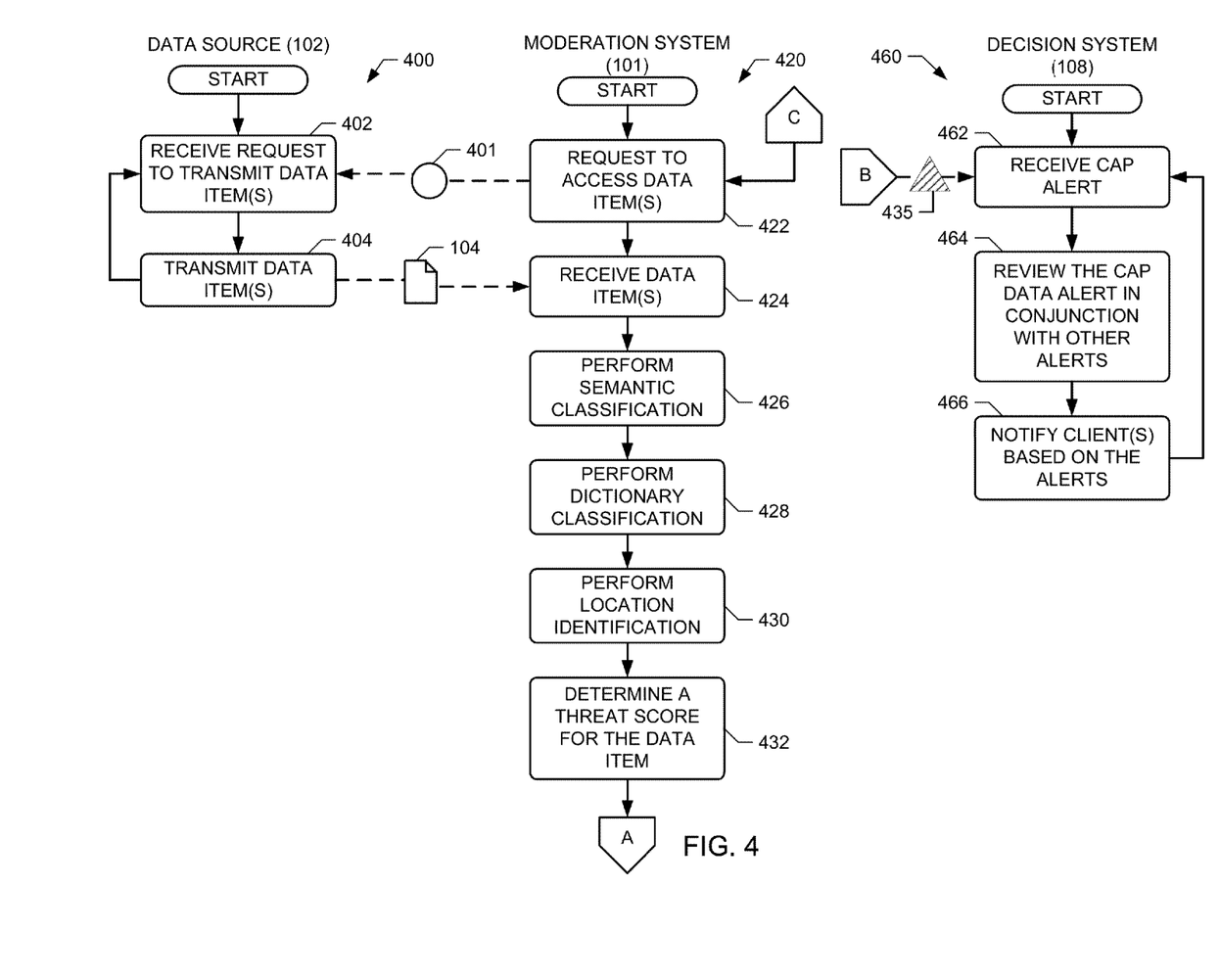
FIGS. 4 and 5 show flow diagrams illustrating example procedures to determine whether an unstructured data item should be promoted to an alert, according to an example embodiment of the present invention.
Figure 5:
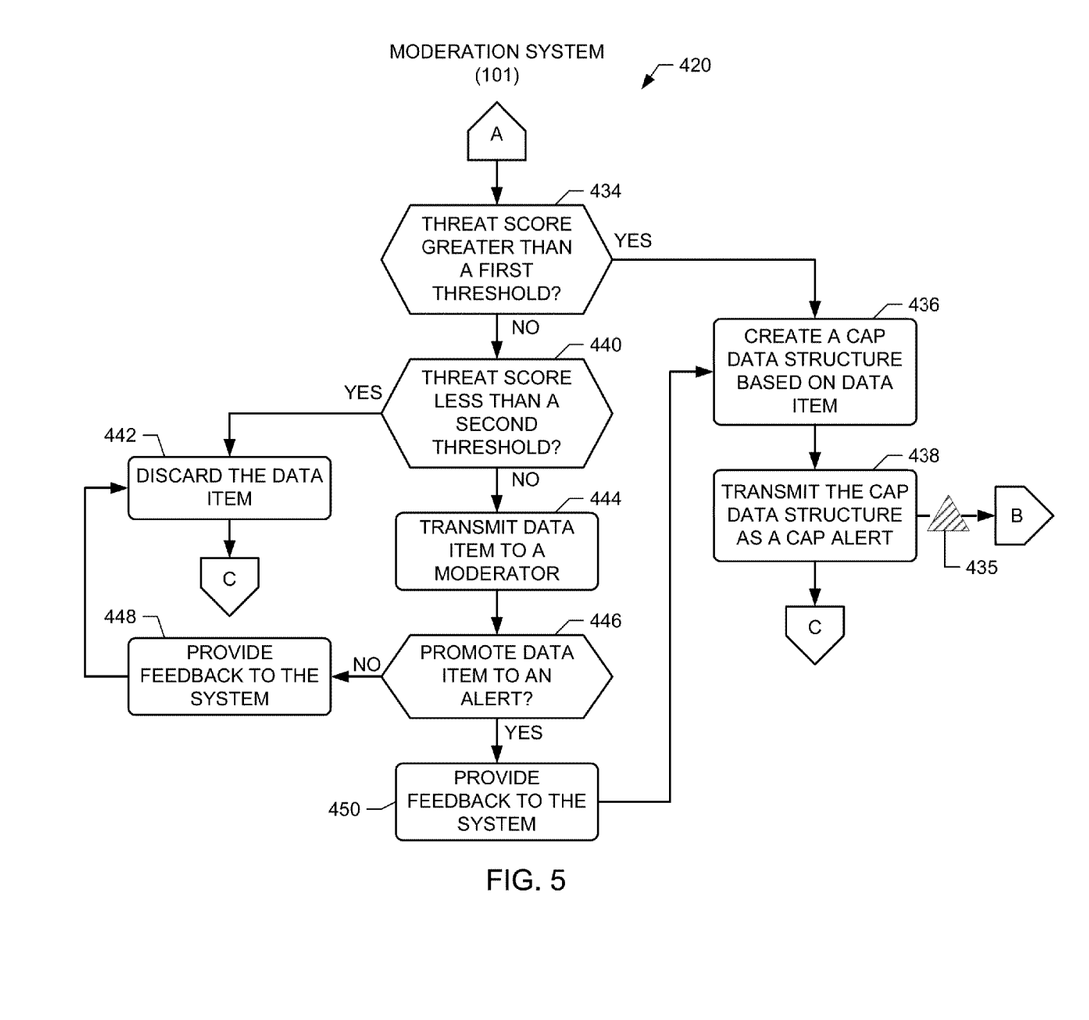

FIGS. 4 and 5 show a flow diagram illustrating example procedures 400, 420, and 460 to determine whether an unstructured data item should be promoted to a CAP alert, according to an example embodiment of the present invention. The example procedures 400, 420, and 460 may be carried out by, for example, the data source 102, the moderation system 101, and/or the decision system 108 described in conjunction with FIGS. 1 to 3. Although the procedures 400, 420, and 460 are described with reference to the flow diagrams illustrated in FIGS. 4 and 5, it will be appreciated that many other methods of performing the functions associated with the procedures 400, 420, and 460 may be used. For example, the order of many of the blocks may be changed, certain blocks may be combined with other blocks, and many of the blocks described are optional. For instance, the example procedure 420 could include a step of identifying a client associated with data item and/or a CAP data structure prior to transmitting the CAP data structure.

The procedure 400 begins when a data source 102 receives a request message 401 to transmit one or more data items to moderation system 101 (block 402). The request message 401 can identify webpage addresses, accounts, or any other identifier of Internet accessible information. The data source 102 then identifies and transmits the data item(s) 104 to the moderation system 101 (block 404). For example, FIG. 6 shows an example of an unstructured data item 104 transmitted to the moderation system 101. The example data item 104 is a news article posted to a website that includes text and a map. In other examples, the data item 104 can be an RSS feed of information, social media messages, or any other piece of unstructured information available via the Internet.

The example procedure 400 then returns to block 402 when another request for data item(s) is received. In other embodiments, the data source 102 periodically transmits data items to the moderation system 101 based on the request message 401. Alternatively, the example procedure 400 ends.

The example procedure 420 begins when the moderation system 101 transmits a request message 401 to data source 102 (block 422). As discussed above, the request message 401 can include a subscription request to information and/or a request for information hosted by the data source 102. Responsive to sending the request message 401, the moderation system 101 (via the interfaces 202 and 204 of FIG. 2) receives one or more data items 104 (block 424).

Figure 7:
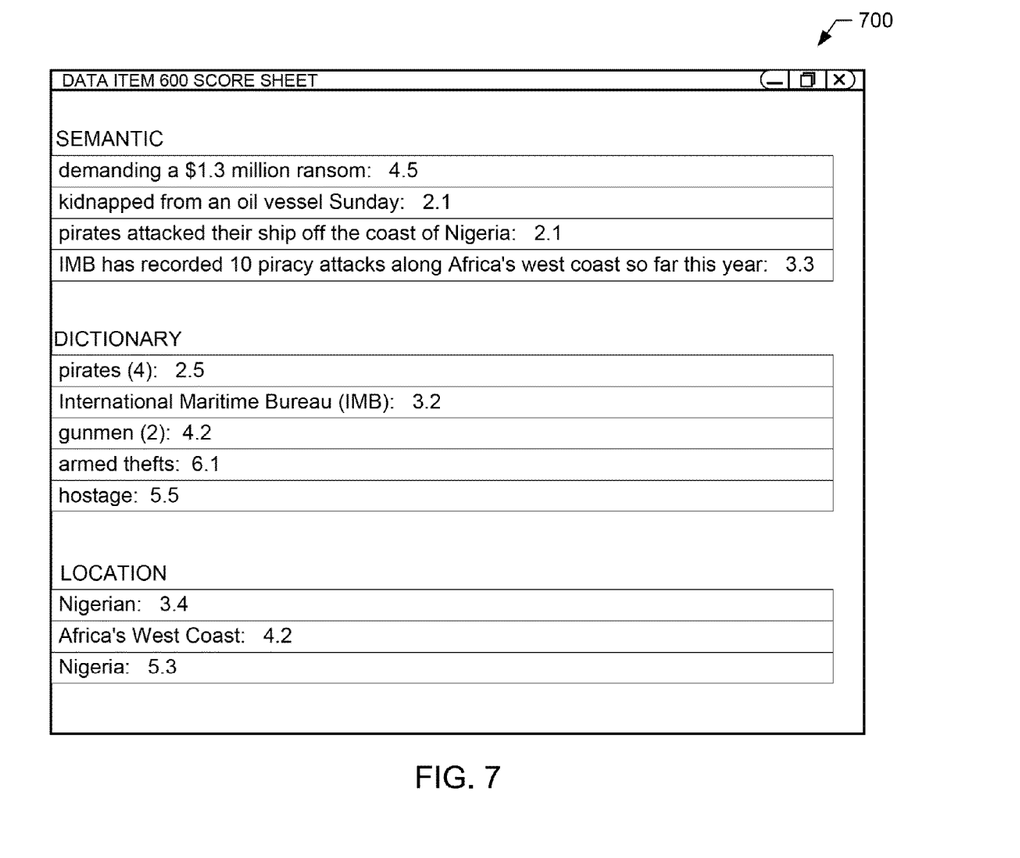
FIG. 7 shows a diagram of an example data structure that includes compiled threat scores for the data item of FIG. 6.

The example moderation system 101 then performs a semantic classification, a dictionary classification, and location identification, as described above in conjunction with FIG. 2 (blocks 426, 428, and 430). The moderation system 101 also determines a threat score based on the classifications (block 432). FIG. 7 shows a diagram of an example data structure 700 that graphically shows how threat scores are compiled and calculated for the data item 104 of FIG. 6. It should be noted that the data structure 700 is only representative in nature to graphically illustrate how threat scores are compiled based on a data item 104. In other embodiments, the moderation system 101 may store and/or associate a determined threat score with the data item 104 instead of creating a separate data structure.

In this example, the semantic classifier 206 scans the data item 104 for patterns, tones, and language that match pre-identified content/information. For instance, the semantic classifier 206 determines that the phrases from the data item 104 of FIG. 6 shown in FIG. 7 under the 'Schematic' section match pre-identified content. Next to each phrase is a corresponding threat score that is associated with the matching pre-identified content. In this example, the semantic threat score is 12.

The data structure 700 of FIG. 7 also includes a 'Dictionary' section that identifies terms from the data item 104 of FIG. 6 that match pre-identified terms having associated threat scores. The numbers in parenthesis correspond to a number of times the term was included within the data item 104, which may be used to weight the threat score. In this example, the dictionary threat score is 21.5.

The data structure 700 also includes a 'Location' section that identifies geographic locations referenced in the data item 104. It should be noted that the location identifier 210 also analyzes the map shown in FIG. 6 in addition to the text of the article. In this example, the location threat score is 12.9.

After determining threat scores for each section, the moderation system 101 combines the threat scores to generate a total threat score (e.g., 46.4). In other embodiments, the moderation system 101 determines a total threat score without determining threat scores for separate sections. In yet other embodiments, the moderation system 101 determines a threat score for each field (e.g., certainty, severity, category, and urgency) associated with a CAP template.

Figure 8:
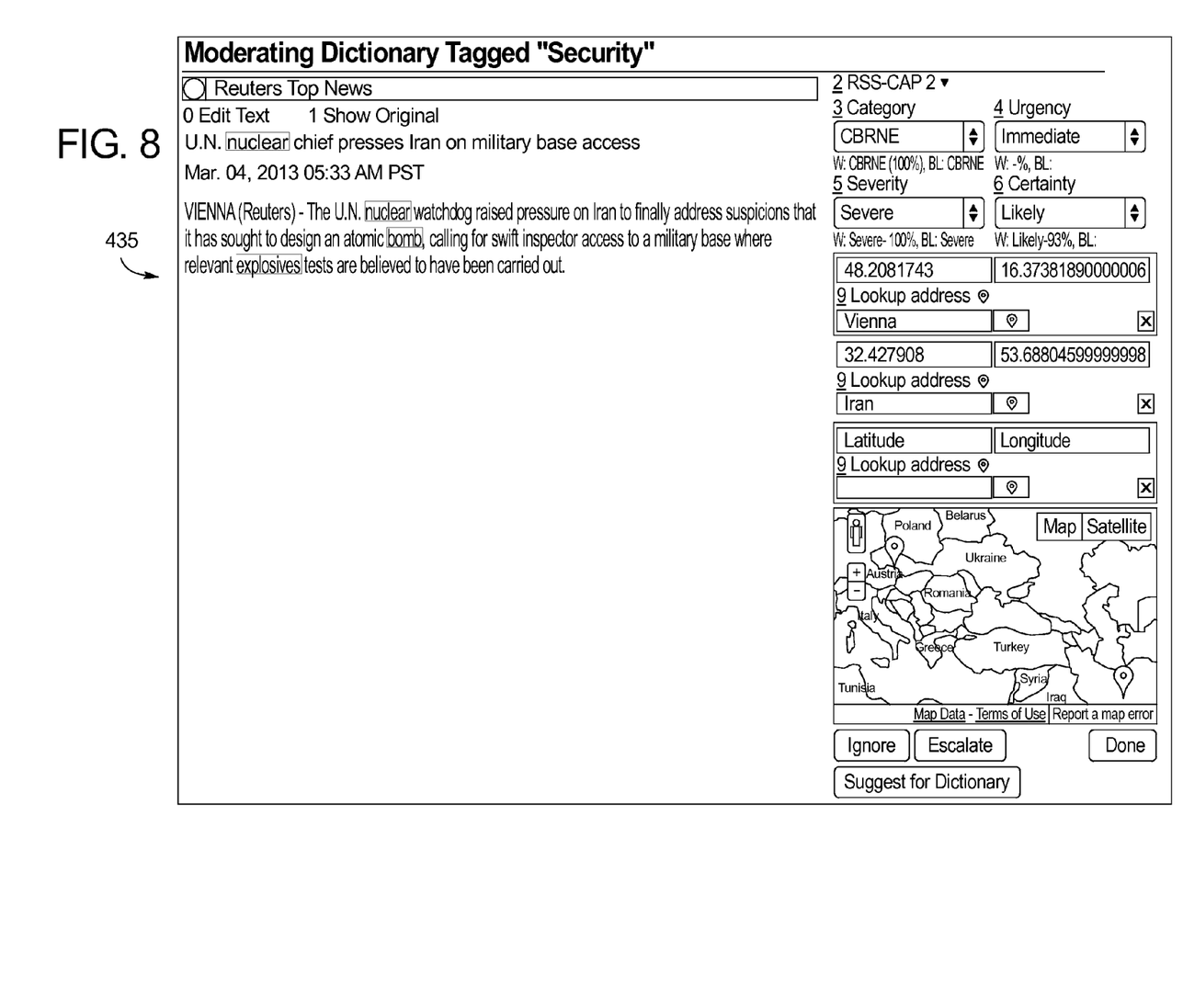
FIG. 8 shows a diagram of a graphical representation of a CAP data structure.

Returning to the example procedure 420 of FIG. 5, after determining the threat score, the moderation system 101 determines whether the threat score is greater than a first threshold (block 434). Responsive to determining that the threat score is greater than the first threshold, the moderation system 101 creates a CAP data structure 435 based on at least some of the content or information within the data item 104 (block 436). FIG. 8 shows a diagram of a graphical representation of the CAP data structure 435. It should be noted that in this example the CAP data structure 435 is only a representative embodiment and was not actually generated from the data item 104 of FIG. 6. It should also be noted that the CAP data structure 435 includes fields for certainty, severity, category, and urgency. In addition, the CAP data structure 435 includes a geographic field, a title field, and a description field that includes text from, for example, a data item. Moreover, the CAP data structure 435 includes a field for displaying a map, which corresponds to a map shown in a data item. Alternatively, the moderation system 101 may generate the map shown in the CAP data structure 435 based on identified geographic information. In other embodiments, the CAP data structure 435 includes a section for displaying video or playing audio that was included within a data item.

In the illustrated embodiment of FIG. 5, the moderation system 101 transmits the generated CAP data structure 435 as a cap alert (block 438). In some embodiments, the CAP data structure 435 is transmitted to the decision system 108 of FIG. 1. Alternatively, the CAP data structure 435 is transmitted to a client 112 or a client device 110. After transmitting the CAP data structure 435, the example procedure 420 returns to block 422 to request additional data items 104. Alternatively, the example procedure 420 ends. It should be appreciated that in some embodiments the moderation system 101 receives data items while at the same time classifying other data items and creating CAP data structures from yet other data items.

Returning to block 434, if the threat score is not greater than the first threshold, the moderation system 101 determines if the threat score is less than a second threshold, which is lower than the first threshold (block 440). Responsive to determining that the threat score is less than a second threshold, the moderation system 101 discards the data item 104 (block 442). The example procedure 420 then returns to block 422 to request additional data items.

However, in block 440, if the threat score is greater than the second threshold, the moderation system 101 transmits the data item 104 to personnel working in conjunction with moderator 216 (block 444). Based on an analysis by the personnel, the moderation system 101 determines whether the data item is to be promoted to an alert (block 446). If the data item 104 is not to be promoted, the moderation system 101 provides feedback regarding the data item to be discarded, thereby causing the calibration processor 214 and/or the classifiers 206, 208, and 210 to amend the appropriate threat scores and/or pre-identified content/information (block 448). The example procedure 420 then discards the data item (block 442) and returns to block 422 to request additional data items.

In contrast, if the data item is to be promoted, the moderation system 101 provides feedback regarding the promotion, thereby causing the calibration processor 214 and/or the classifiers 206, 208, and 210 to amend the appropriate threat scores and/or pre-identified content/information (block 450) based on the promotion. In other words, the calibration processor 214 and/or the classifiers 206, 208, and 210 increase a threat score (e.g., a weight of a threat score) for the pre-identified information that matches information within the data item 104. The example procedure 420 then executes blocks 436 and 438 to create and transmit the CAP data structure 435. The example procedure 420 then returns to block 422 to request additional data items.

The example procedure 460 of FIG. 4 begins when a decision system 108 receives a CAP data structure 435 from, for example, the moderation system 101 (block 462). The decision system 108 then analyzes the CAP data structure 435 as an alert in conjunction with other alerts (block 464). It should be appreciated that the alerts include other CAP data structures generated from previously processed unstructured data items. The alerts can also include CAP data structures received from structured data items.

In this embodiment, the example decision system 108 identifies and notifies a client based on the alerts (block 466). The procedure 460 then returns to block 462 for the next CAP data structure. In other embodiments, the decision system 108 may not notify a client if the aggregation of the alerts is not serious for that client. The example procedure 460 continues to operate as new CAP data structures are received.

CAP Data Structure Embodiment

As discussed above, a CAP data structure includes content from a data item accordingly labeled based on predefined template data fields. FIG. 8 shows a graphical example of one such CAP data structure. The XML code shown below includes a CAP data structure implemented as a series of instructions. It should be noted that the instructions include labels for the different fields, including urgency, certainty, category, and severity. In addition, the data structure includes fields for a description, a headline, a time a corresponding data item was transmitted (e.g., <sent>) from a data source, and an identifier of the data source (e.g., <senderName>). The data structure also includes hyperlinks to additional information, which may be displayed as links in a graphical representation of the CAP data structure. Alternatively, the linked content may be shown in conjunction with the information provided in the CAP data structure.

```
<![CDATA[<?xml version="1.0" encoding="UTF-8"?>
<alert xmlns="http://www.incident.com/cap/1.0">
<identifier>43b080713727</identifier>
<sender>hsas@dhs.gov</sender>
<sent>2003-04-02T14:39:01-05:00</sent>
<status>Actual</status>
<msgType>Alert</msgType>
<scope>Public</scope>
<info>
<category>Security</category>
<event>Homeland Security Advisory System Update</event>
<urgency>Immediate</urgency>
<severity>Severe</severity>
<certainty>Likely</certainty>
<senderName>U.S. Government, Department of Homeland Security</senderName>
<headline>Homeland Security Sets Code ORANGE</headline>
<description>The Department of Homeland Security has
elevated the Homeland Security Advisory System threat level to
ORANGE
/ High in response to intelligence which may indicate a heightened
threat of terrorism.</description>
<instruction> A High Condition is declared when there is
a high risk of terrorist attacks. In addition to the Protective
Measures taken in the previous Threat Conditions, Federal departments
and agencies should consider agencyspecific Protective Measures in
accordance with their existing plans.</instruction>
<web>http://www.dhs.gov/dhspublic/display?theme=29</web>
<parameter>HSAS=ORANGE</parameter>
<resource>
<resourceDesc>Image file (GIF)</resourceDesc>
<uri>http://www.dhs.gov/dhspublic/getAdvisoryImage</uri>
</resource>
<area>
<areaDesc>U.S. nationwide and interests
worldwide</areaDesc>
</area>
</info>
</alert>]]>
```

CONCLUSION

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
receiving a data item from a remotely located information source, the data item including unstructured information;
determining a threat score for the data item by matching information associated with the data item to pre-identified information associated with a numerical value;
responsive to the threat score exceeding a predetermined threshold, determining labels for at least one Common Alerting Protocol field associated with a Common Alerting Protocol data structure using at least a portion of the information associated with the data item by:
determining a first label for an urgency field within the Common Alerting Protocol data structure based on the threat score and the data item,
determining a second label for a severity field within the Common Alerting Protocol data structure based on the threat score and the data item,
determining a third label for a category field within the Common Alerting Protocol data structure based on the threat score and the data item, and
determining a fourth label for a certainty field within the Common Alerting Protocol data structure based on the threat score and the first data item;
creating the Common Alerting Protocol data structure that includes the labels; and
transmitting the Common Alerting Protocol data structure for use within a decision system or to cause security personnel to perform an action.

2. The method of claim 1, further comprising:
responsive to determining that the threat score is below a second predetermined threshold, disregarding the data item,
wherein the second predetermined threshold is less than the predetermined threshold.

3. The method of claim 2, further comprising responsive to determining that the threat score is greater than the second predetermined threshold and less than the predetermined threshold, routing the data item to a moderator.

4. The method of claim 3, further comprising
receiving a message from the moderator regarding the data item;
responsive to the message including an indication to promote the data item, creating the Common Alerting Protocol data structure that includes at least the portion of the information associated with the data item and transmitting the Common Alerting Protocol data structure;
responsive to the message including an indication to disregard the data item, deleting the data item; and
amending the pre-identified information based on the message from the moderator and the information associated with the data item.

5. The method of claim 4, wherein amending the pre-identified information includes changing the numerical value of the pre-identified information.

6. The method of claim 4, wherein amending the pre-identified information includes adding at least one term to the pre-identified information from the information associated with the data item.

7. The method of claim 1, wherein determining the threat score includes i) classifying the information associated with the data item based on matches to pre-identified semantic information, ii) classifying the information associated with the data item based on matches to dictionary terms or phrases, iii) determining a geographic location corresponding to the information associated with the first data item, and iv) assigning the threat score based on the classifications and the geographic location.

8. The method of claim 1, further comprising determining a client among a plurality of clients that is to receive the Common Alerting Protocol data structure based on the at least a portion of the information associated with the data item being associated with the client.

9. The method of claim 1, wherein at least one additional label is determined for a geographic field within the Common Alerting Protocol data structure based on the threat score and the data item.

10. A machine-accessible device comprising a memory having instructions stored thereon that, when executed, cause a machine to at least:
determine a threat score for a first data item received from a data source by matching unstructured content within the first data item to pre-identified content associated with at least a value;
responsive to the threat score exceeding a predetermined threshold, determine labels for at least one Common Alerting Protocol field for a Common Alerting Protocol data structure using at least a portion of the content associated with the first data item by:
selecting a first label for an urgency field within the Common Alerting Protocol data structure based on the threat score and the first data item;
selecting a second label for a severity field within the Common Alerting Protocol data structure based on the threat score and the first data item;
selecting a third label for a category field within the Common Alerting Protocol data structure based on the threat score and the first data item; and
selecting a fourth label for a certainty field within the Common Alerting Protocol data structure based on the threat score and the first data item;
create the Common Alerting Protocol data structure that includes the labels; and
transmit the Common Alerting Protocol data structure causing security personnel associated with a client to perform an action.

11. The machine-accessible device of claim 10, further comprising instructions stored thereon that are configured when executed to cause the machine to subscribe to the data source to receive the first data item.

12. The machine-accessible device of claim 10, further comprising instructions stored thereon that are configured when executed to cause the machine to:
determine a semantic threat score based on the content within the first data item matching pre-identified semantic content;
determine a dictionary threat score based on the content within the first data item matching pre-identified dictionary content; and
determine the threat score by combining the semantic threat score with the dictionary threat score.

13. The machine-accessible device of claim 10 further comprising instructions stored thereon that are configured when executed to cause the machine to determine a geographic location referenced within the first data item.

14. The machine-accessible device of claim 10, further comprising instructions stored thereon that are configured when executed to cause the machine to:

determine a second threat score for a second data item received from a second data source by matching content within the second data item to the pre-identified content;

responsive to the second threat score exceeding the predetermined threshold, create a second Common Alerting Protocol data structure that includes at least a portion of the content associated with the second data item; and responsive to determining the portion of the content associated with the second data item substantially matches the portion of the content associated with the first data item, discarding the second Common Alerting Protocol data structure.

15. The machine-accessible device of claim 10, wherein the unstructured content includes at least one of text, a picture, a graph, a chart, a video, audio, an image, and a map.

16. An apparatus comprising at least one hardware processor that in aggregate includes:
   an interface configured to receive an unstructured data item from a data source;
   a semantic classifier configured to determine a first threat score by determining content within the data item that matches pre-identified semantic information;
   a dictionary classifier configured to determine a second threat score by determining the content within the data item that matches pre-identified dictionary information;
   a location identifier configured to determine a third threat score by determining the content within the data item that substantially matches geographic location information;
   a content scorer configured to determine whether the combination of the first, second, and third threat scores is greater than a predetermined threshold; and
   a Common Alerting Protocol processor configured to:
   determine labels for at least one Common Alerting Protocol field using at least some of the content within the data item responsive to the content scorer determining that the combined threat score is greater than the predetermined threshold by:
   determining a first label for an urgency field within the Common Alerting Protocol data structure based on the threat score and the data item,
   determining a second label for a severity field within the Common Alerting Protocol data structure based on the threat score and the data item,
   determining a third label for a category field within the Common Alerting Protocol data structure based on the threat score and the data item, and
   determining a fourth label for a certainty field within the Common Alerting Protocol data structure based on the threat score and the first data item, and
   create a Common Alerting Protocol data structure that includes the labels for use by a decision system or security personnel.

17. The apparatus of claim 16, further comprising a transmitter configured to transmit the Common Alerting Protocol data structure to the decision system.

18. The apparatus of claim 16, further comprising a calibration processor configured to calibrate the semantic classifier by analyzing previously received data items to determine the pre-identified semantic information.

19. The apparatus of claim 18, wherein the calibration processor is configured to:
   receive feedback from a moderator regarding a previously scored data item; and
   amend the pre-identified semantic information based on the feedback.

20. The apparatus of claim 19, wherein the semantic classifier includes a machine learning algorithm.

* * * * *